United States Patent [19]
Dunn

[11] Patent Number: 5,961,074
[45] Date of Patent: Oct. 5, 1999

[54] METHOD AND APPARATUS FOR PRESSURIZED FEEDING OF LIQUID PROPELLANTS TO A ROCKET ENGINE

[75] Inventor: Bruce P. Dunn, Vancouver, Canada

[73] Assignee: The University of British Columbia, Vancouver, Canada

[21] Appl. No.: 09/005,949

[22] Filed: Jan. 12, 1998

Related U.S. Application Data

[63] Continuation-in-part of application No. 08/503,352, Jul. 17, 1995, Pat. No. 5,823,478.

[51] Int. Cl.$^6$ ..................................................... B64G 1/40
[52] U.S. Cl. ................................. 244/135 R; 244/138 R; 244/172; 60/204; 60/259
[58] Field of Search ........................... 244/135 R, 158 R, 244/172; 137/571, 209, 598, 590; 60/259, 39.48, 39.14, 204; 222/61, 394, 397, 399, 95

[56] References Cited

U.S. PATENT DOCUMENTS

| | | |
|---|---|---|
| 2,505,798 | 5/1950 | Skinner . |
| 2,701,441 | 2/1955 | Mitchell . |
| 3,350,886 | 11/1967 | Feraud et al. . |
| 3,427,808 | 2/1969 | Butcher . |
| 3,525,217 | 8/1970 | De Mattia, Jr. et al. . |
| 3,595,020 | 7/1971 | Schubert et al. . |
| 3,668,868 | 6/1972 | Krzycki . |
| 3,740,945 | 6/1973 | Lovingham . |
| 3,945,203 | 3/1976 | Kayser . |
| 4,650,139 | 3/1987 | Taylor et al. ........................ 244/135 A |
| 4,880,185 | 11/1989 | Apfel . |
| 5,071,093 | 12/1991 | Perdu ...................................... 244/172 |
| 5,263,666 | 11/1993 | Hubert et al. . |
| 5,471,833 | 12/1995 | Pahl . |

FOREIGN PATENT DOCUMENTS

| | | |
|---|---|---|
| 2249081 | 11/1973 | Germany . |
| 2051246 | 1/1981 | United Kingdom . |

OTHER PUBLICATIONS

Modern Engineering Design of Liquid Propellant Rocket Engine, Huzel et al., American Institute of Aeronautics and Astronautics, vol. 147 (1992), Claim 5, pp. 135–153.

*Primary Examiner*—Galen L. Barefoot
*Attorney, Agent, or Firm*—Christensen O'Connor Johnson Kindness PLLC

[57] ABSTRACT

A method and system for delivering pressurized propellants to a rocket engine, that has significant advantages over the current state-of-the-art. One of the propellants, the "pressurizing propellant", is at least partially vaporized and the vapor is in pressure communicating relationship with other propellants on board the rocket-propelled vehicle. This vapor pressure pressurizes the propellants to a sufficient degree that they can be charged directly to the rocket engine, or the pressure may be boosted through pumps, if required. Moreover, the pressurized vapor may be used in other applications on board the vehicle, such as orbital adjustment, attitude control, station keeping, and the like. In several embodiments, the propellants are contained in variable volume reservoirs, exemplified by bladders and diaphragms. These variable volume reservoirs are preferably not subjected to tensile stresses when expanded, and are preferably designed for controlled volume reduction, when being drained of propellant. In some embodiments, the propellant reservoirs are contained in a single housing, and in other embodiments the pressurizing propellant may be contained in a separate tank, as long as pressure communicating relationship is maintained between the propellants. Also provided is a method of refueling one vehicle with liquid propellant from another vehicle, using pressure from a more volatile propellant onboard the supply vehicle.

27 Claims, 7 Drawing Sheets

METHOD AND APPARATUS FOR PRESSURIZED FEEDING OF LIQUID PROPELLANTS TO A ROCKET ENGINE

This is a continuation-in-part of U.S. patent application Ser. No. 08/503,352, filed Jul. 17, 1995, now U.S. Pat. No. 5,823,478, the disclosure of which is incorporated herein, in its entirety, by the foregoing reference thereto.

TECHNICAL FIELD

The invention relates to a liquid propellant feed system, that may be used to feed two or more liquid propellants to a rocket engine under pressure. More particularly, a substantial proportion, or all of, the pressure for feeding the liquid propellants is supplied by at least one of the liquid propellants, that is in pressure communicating relationship with the other propellants.

Most rockets utilize either pump-fed liquid propellants, or solid propellants. For some applications, pressure-fed liquid propellants are used. Typically, these propellants are stored in tanks which are pressurized with a gas, such as helium. The pressurized propellants are then fed from their pressurized onboard tanks to the rocket engine. The usual propellants used are monomethyl hydrazine and nitrogen tetroxide.

Pressure-fed liquid propellant rockets are typically heavier than pump-fed rockets, and therefore lack the performance characteristics of the latter. However, they are reliable, and well adapted to missions requiring stopping and starting the engine several times. Because of this advantage, the Space Shuttle uses pressure-fed liquid rockets in its orbital maneuvering system, and its attitude control system. Most geosynchronous communication satellites use small pressure-fed liquid rocket engines for station keeping, and for desaturation of momentum wheels used to control spacecraft attitude. Pressure-fed liquid rocket engines are also used in interplanetary spacecraft for course correction, orbital insertion, and other important functions that must be reliably performed.

The simplest method of pressurizing a liquid propellant from a tank is a "blowdown" system. In this system, the tank is only partially filled with liquid propellant, then a high pressure gas is introduced into the usage space above the liquid propellant. Typically, helium is used as the pressurizing gas because of its low molecular weight, lack of chemical reactivity, and relative insolubility in propellants. As the pressurized propellant is fed to the rocket engine, the pressure in the propellant tank decreases due to expansion of the gas. When a substantial fraction of the propellant is withdrawn rapidly, there is little time for heat transfer from the tank walls and pressurized propellants to the gas. In this event, the gas expands adiabatically rather than isothermally, so that the gas cools as it expands. This cooling exacerbates the decreasing pressure in the tank.

To counteract the effect of decreasing pressure caused by propellant withdrawal from the pressurized tank, a separate tank of high pressure gas may be provided. Gas from this separate storage tank is then introduced into the propellant tank to regulate the pressure on the propellant. Such stored gas systems require complex plumbing and have a number of failure modes related to leaking pressure regulators, and migration of propellant past check valves. It is believed that a failure in the helium pressurization system for the bipropellant engine of the Mars Observer is responsible for the loss of this spacecraft.

Blowdown systems suffer from excessive vehicle size, while stored gas systems suffer from complexity. Both have the disadvantage of having relatively large inert masses. The performance of these systems may be improved by heating the pressurizing gas, but this imposes yet further complexity, with resultant decrease in reliability. There yet exists a need for a method and apparatus for delivering pressurized liquid propellants to a rocket engine under operating conditions, that is reliable, and of relatively low mass, to allow a maximum payload. Moreover, the method and apparatus should be simple and relatively inexpensive so that it would be cost effective in comparison with not only existing pressurized propellant systems, but also pump-fed systems.

U.S. Pat. No. 2,701,441 relates to a jet propulsion system in which a portion of a liquid oxygen propellant is gasified in a heat exchanger, and the gas is then used to pressurize both fuel and the oxygen propellants. To achieve this, a portion of the liquid oxygen propellant that is stored on board the vehicle is lead through a heat exchanger located in a relatively warmer part of the fuel system, for example, around a conduit leading from the fuel propellant tank to the combustion chamber. If the gaseous oxygen formed in this exchanger is not at a sufficiently high temperature, the gas may be passed through a second stage heat exchanger or super heater contiguous to the combustion chamber or its exit duct. There is no teaching or suggestion that there is a first volatile liquid propellant with a volatility sufficient under ordinary operating conditions to pressurize propellants into a rocket engine.

DISCLOSURE OF THE INVENTION

The invention provides a method and apparatus for delivering pressurized liquid propellants to a rocket engine that provides significant advantages over the current state-of-the-art. In accordance with the invention, one of the propellants (the "pressurizing propellant") is at least partially vaporized and the vapor is in a pressure communicating relationship with the other propellants (the "pressurized propellants"). The vapor pressure pressurizes the propellants so that they can be charged to the rocket engine, or applied to another use onboard the vehicle.

Since the pressurizing vapor is a vapor in equilibrium with one of the propellants, the invention eliminates the need to carry a separate pressurizing gas to pressurize the propellants, as is common in prior art systems. This eliminates the need for a pressurizing gas tank, and associated equipment necessary to use the pressurizing gas to pressurize the propellants (stored gas systems), or the need for a propellant reservoir with a very large ullage space (blowdown system). Moreover, the use of propellant vapor as a pressurizing gas may in certain instances lead to an increase in payload. While residual vapor will occupy the ullage space left by used up propellant, and while the mass of this vapor may be higher than the mass of a pressurizing gas used in blowdown or stored gas systems, such as helium, the reduction in mass achieved by the elimination of the tankage needed to store the pressurizing agent in gaseous form compensates for the additional mass of the residual vapor.

In accordance with the apparatus or system of the invention, at least two propellants must be used: a first propellant that has a first volatility, and a second propellant that has a second volatility, where the second volatility is less than the first volatility. The propellants should be in pressure communicating relationship with vapor of the first propellant (the "pressurizing propellant"). The first propellant should be selected such that its volatility under operating conditions provides a vapor pressure sufficiently high to pressurize all propellants to a predetermined pressure so that the propellants may be fed under pressure to the rocket engines. In certain embodiments, the pressurized propellants may be charged to the suction or inlet end of a pump to boost the propellant pressure, if required. In other embodiments, the volatility of the first propellant may be selected so that the vapor pressure of this propellant by itself is sufficient to pressurize the propellants without need for a booster pump.

In one embodiment of the invention, the liquid propellants are contained in a single housing, in pressure communicating relationship with each other. In this embodiment, the highest volatility propellant, the "pressurizing propellant", is segregated from each of the other propellants but is nonetheless in a pressure communicating relationship with the other propellants. This segregation may be achieved by, for instance, a diaphragm in the housing separating the pressuring propellant from the other propellants. Alternatively, the pressurizing propellant may be contained in an expandable or collapsible container within the housing. As a further alternative, propellants other than the pressurizing propellant may each be contained in a separate expandable or collapsible container within the housing.

In an alternative embodiment, the liquid phase of the pressurizing propellant is contained in a separate housing. The vapor space of the pressurizing propellant is in pressure communicating relationship with the ullage spaces of other reservoirs containing other propellants, to pressurize these propellants. If the other propellants are chemically compatible with the pressurizing gas, then the pressurizing gas can be allowed to directly contact the other propellants. If, on the other hand, the pressurizing gas and the other propellants are not chemically compatible, then the reservoirs of the other propellants may be separated from the pressurizing gas by a physical division, such as a diaphragm, or by encapsulating these in a variable volume container, such as a bladder or bellows-like container. In an alternative arrangement, a thin layer of a chemically inert liquid or gas may be positioned between the pressurizing gas and the other propellants to similarly achieve physical separation, i.e., no contact, while maintaining pressure communication. In this arrangement, the inert material must be lower in density than the other propellants, but higher in density than the pressurizing gas. The inert material should also be selected so that it is immiscible with, or substantially insoluble in, the other propellants. While this alternative embodiment requires additional hardware, including at least one additional storage tank, the embodiment is nevertheless well-suited for certain applications. Under zero gravity conditions, the inert layer embodiment should not be used, and the variable volume container embodiment is preferred.

In order to ensure complete utilization of the propellants, the invention also provides a propellant reservoir drainage apparatus. This drainage apparatus generally funnels the propellant to a conduit that is in fluid communication with the rocket engine. The drainage apparatus is formed in the variable volume reservoirs of the invention, that are fabricated from a flexible material, such as an organic polymeric membrane, by attaching a suitably weighted member having an optional throughbore to one side of the membrane so that the weight forms a depression in the membrane under force of gravitational or rocket acceleration ("gravity"). Preferably, the attachment is to a circular section of the surface of the membrane thereby creating a substantially funnel-shaped depression for directing fluid towards the base of the funnel, where the weighted member is located. A flexible hose then extends forward from the weighted member (when it has no throughbore) or aft through the bore in the weighted member, to drain away any liquid that flows into the depression. Moreover, in order to prevent any liquid swirling effect that may arise in the depression when propellant flows rapidly into the drain, the invention provides optional baffles that may be installed within the funnel-shaped drain to ensure a substantially continuous supply of propellant, even as the propellant reservoir is rapidly drained or when it is nearly empty.

The system of the invention also provides a high-pressure vapor, the vapor of the pressurizing propellant. This vapor may be charged to cold gas thrusters, to adjust the attitude of the vehicle in orbit, or charged to other vehicle systems to perform a variety of functions.

In accordance with the method of the invention, as explained above, pressure is applied from a pressurizing propellant to other propellants, in pressure communicating relationship with the pressurizing propellant. As a result of the applied pressure, the other propellants are pressurized to a predetermined pressure. The propellants are then fed under motive force of the applied pressure to a rocket engine. In certain instances, the feeding of the propellants to the rocket engine may include feeding the propellants to a booster pump if a higher pressure is required.

The invention also provides numerous other advantages. For example, the invention provides a pressurized fuel system that self-throttles the rocket engine. This self-throttling action is inherent in the invention because, as the propellants are used, the pressurizing propellant boils, or vaporizes, to produce pressurizing gas. As a result of this vaporization, the pressurizing propellant gradually cools, and its vapor pressure gradually decreases. This lowers the pressure of the gas phase of the pressurizing propellant, which is in dynamic equilibrium with the liquid propellant. As a result, the pressure on all propellants in pressure communication with the pressurizing propellant gradually decreases as propellant is used up. If the propellants are fed directly to a rocket engine, without passing through a pressure boosting pump, then this will result in gradual reduction in propellant flow to the engine, and thus a gradual reduction in engine thrust.

In addition, the fuel system of the invention may be shut off and reactivated reliably and repeatedly. This is a clear advantage in applications, such as orbital transfers or adjustments, which require repeated engine firings.

The invention also provides for a simple and reliable method of transfer of propellants from one tank to another under zero gravity conditions. In order to achieve this, the donor tank of the fueling vehicle is coupled to achieve fluid communication with a receiving tank of the vehicle to be fueled. The pressurizing propellant reservoir of the fueling vehicle, in pressure communication with the donor tank, is then heated, by differential solar heating or by electrical heating. This causes the donor tank to be at a higher pressure than the receiving tank. A propellant, or a number of propellants other than the pressurizing propellant, can then be transferred from donor tanks to receiving tanks through interconnecting conduits fitted with control valves. As the propellants are expelled from the donor tanks into the receiving tanks, the pressurizing propellant of the donor tank evaporates to maintain its pressure and fill any voided space with pressurizing gas. On the other hand, as propellant transfer into the receiving tanks continues, the vapor phase of the pressurizing propellant in the receiving tanks condenses under increasing pressure. Thus, as transfer proceeds, the donor tank will become cooler due to volatile pressurizing propellant evaporation and the receiving tank will become warmer, due to the entry of warm propellant, and the condensation of its own volatile pressure propellant. This phenomenon will tend to lower the pressure differential between the donor tank and the receiving tank, and reduce the rate of transfer of propellant. However, as long as the temperature (and hence pressure) of the donor tank is maintained at a higher level than that of the receiving tank, the transfer will continue. Once the pressurized propellants have been transferred from the donor tanks, the pressurizing propellant may be transferred to a receiving pressurizing propellant reservoir by opening a valve in a conduit establishing fluid communication between the pressurizing donor reservoir and the propellant receiving reservoir. Under zero gravity conditions, both gas and liquid may be transferred, depending upon the exact behavior of the pressurizing liquid in the zero gravity condition, when an outlet to the donor reservoir is opened. After most of the pressurizing liquid has been transferred, any residual liquid in the donor reservoir will gradually evaporate and condense in the receiving reservoir, due to the difference in temperature between the reservoirs. Significantly, propellant transfer does not require an external source of pressurized gas to drive propellant from the donor tanks, nor does it require pumps, or venting of gas from the receiving tanks. Furthermore, transfer can be carried out without surface tension propellant acquisition devices in the tanks.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

BEST MODES FOR CARRYING OUT INVENTION

The invention provides a unique and highly efficient pressurized fuel system, and method of using the system, for providing propellants to a rocket engine under pressure. In accordance with the invention, any number of propellants may be supplied under pressure, as long as the propellants are in pressure communication with at least one propellant, a "pressurizing propellant", that has a volatility such that its vapor pressure under operating conditions is sufficient to pressurize the propellants to a required predetermined pressure. The invention eliminates the need for a separate non-propellant pressurizing agent and equipment for containing and controlling this agent, and thereby potentially increases the reliability of the vehicle by reducing complexity. The high-pressure vapor of the pressurizing propellant can be used in cold gas thrusters, or otherwise, to achieve a variety of purposes, such as vehicle attitude adjustment, vehicle orbital control, and station keeping.

In the specification and claims, the term "reservoir" is used to refer to a volume occupied by a propellant, where the volume may be bounded or encapsulated by a container, such as a metal container; or a flexible-walled membrane, such as an organic polymeric membrane; or the propellant may be only partially surrounded by a container or membrane and may be sealed from contact with other propellants with another fluid. The latter fluid may be selected from inert liquids and dense gasses, i.e., those fluids that do not react with the propellants. The term "variable volume", used in conjunction with the terms "reservoir" or "container", refers to a reservoir or container that has a changeable volume, as the propellant is being depleted, or being refilled. Thus, the term encompasses, for instance, a "bladder" that is made of a flexible material, such as an organic polymeric film; a "bellows-like" container that is designed to expand and collapse in predetermined shape, as it is being filled or depleted for propellant; and the like. It should also be understood, in the specification and claims, that reference to a "pressurizing propellant" refers to the most volatile of the propellants on board the rocket-propelled vehicle. Under the conditions of temperature to which this propellant is subjected, it produces a vapor in equilibrium with the liquid propellant. The liquid and vapor are at the same pressure, and while the vapor may be perceived as providing the pressurizing force for pressure feeding of other propellants, the reference to "pressurizing propellant" encompasses both the liquid and its vapor form. Clearly, as the pressurizing propellant (and the other liquid propellant(s)) is itself depleted through being supplied to the rocket engine, pressure is supplied by its vapor expanding into space formerly occupied by liquid propellant.

Embodiments of the invention may be better understood with reference to the appended figures, all schematic diagrams.

Figure 1:
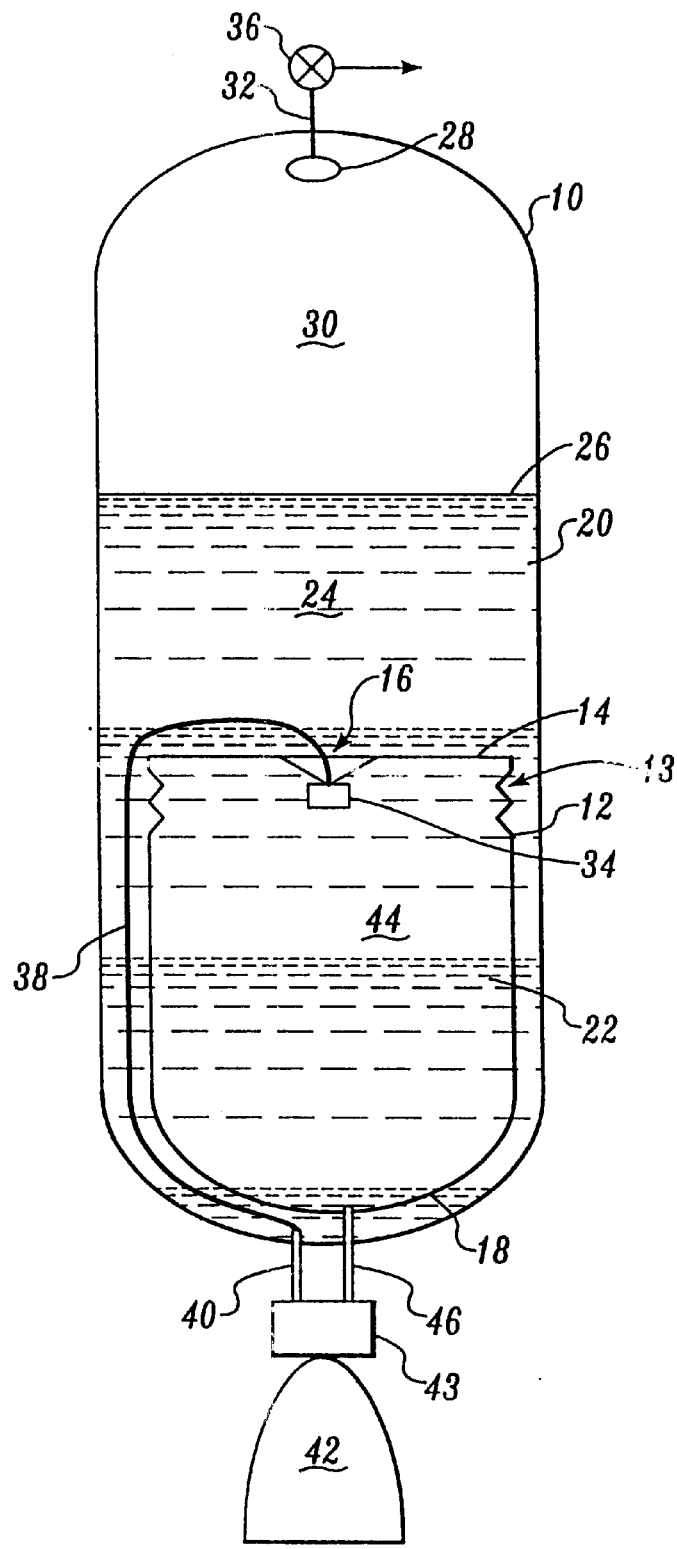
FIG. 1 is a schematic diagram of an embodiment of the invention using a single housing for two propellants, with the pressurized propellant contained in a variable volume reservoir.

FIG. 1 illustrates a single housing embodiment of the invention. In this embodiment, housing 10 contains both the pressurizing (more volatile) propellant 24 and the pressurized (less volatile) propellant 44. Clearly, the invention is not limited to a two-propellant system, but includes the use of a multiplicity of propellants, if required. According to the invention, however, at least one of the propellants must have a sufficiently high volatility so that its vapor pressure under operating conditions is sufficient to pressurize the propellants to a required predetermined pressure for charge to either a booster pump or directly to the rocket engine. In the embodiment of FIG. 1, the housing 10 is of substantially cylindrical shape and contains a reservoir 12 of variable volume, in this instance a substantially cylindrical bladder sized to contain the less volatile propellant 44. The flexible bladder is preferably not under tension and is sufficiently large to accommodate maximum expansion, without significant stretching. Thus, the bladder acts as a "bag" rather than a "balloon". As a result, it may preferably be fabricated from flexible and thin (light weight) organic polymers that are impervious to attack by the propellants for at least the duration of their use.

As shown, reservoir 12 is located in the bottom (or aft end) of the housing 10 and is filled with liquid propellant 44. Some of the propellant has been removed, so that the reservoir 12 has collapsed slightly at its upper end, shown by a series of folds 13. The reservoir 12 is immersed in the liquid pressurizing propellant 24, that has an upper liquid level 26. The liquid pressurizing propellant 24 occupies space 20 of the housing 10. The ullage space 30 above the pressurizing propellant liquid level 26 is filled with vapor in equilibrium with the pressurizing propellant 24. This vapor is clearly in pressure communicating relationship with the propellant 24, and also the propellant 44 contained within reservoir 12.

Figure 1A:
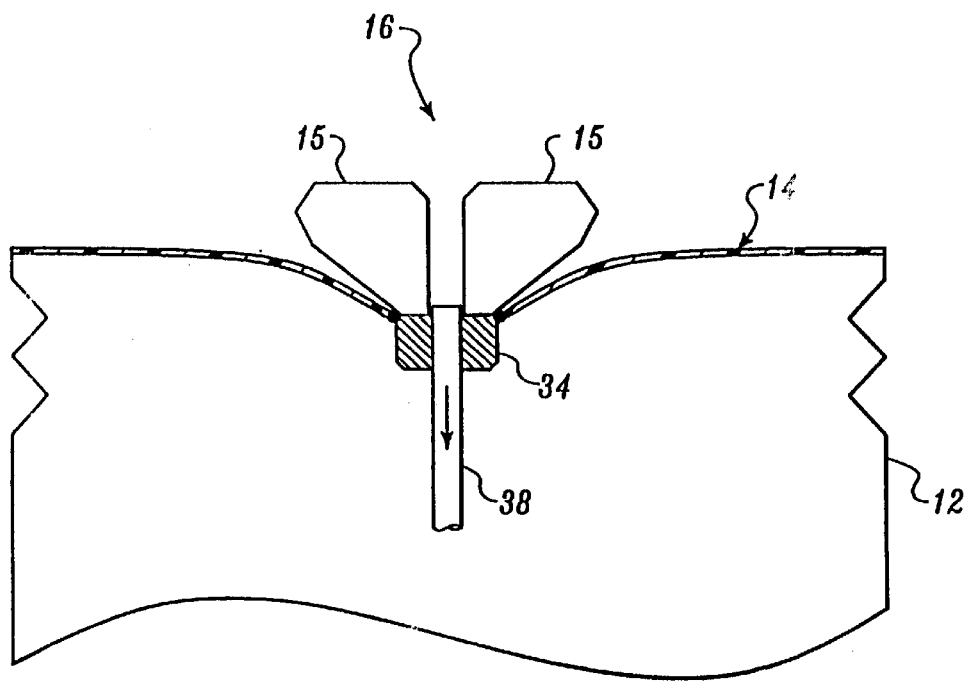
FIG. 1A is a schematic diagram of an embodiment of a propellant drainage depression formed in a surface of a variable volume reservoir, equipped with optional baffles, to ensure substantially complete drainage of propellant.

As shown in FIG. 1, pressurizing propellant 24 is charged to the rocket engine 42 via a flexible tube 38, that has a forward end terminating in a funnel-shaped depression 16 in the upper surface 14 of reservoir 12. The other end of tube 38 connects to engine propellant charge conduit 40. Clearly, the propellant charge system is simplified for purposes of illustration, and would typically include control valves, sensors, and optionally pumps, shown as block 43. In accordance with the invention, in order to ensure complete drainage of the pressurizing propellant 24 to the engine 42, a funnel-shaped depression 16 is formed in the upper surface 14 of reservoir 12, that is in direct fluid communication with the effective lower level of propellant 24. This depression is shown more clearly in FIG. 1A, illustrating an enlarged simplified schematic view of the drainage arrangement. As shown, a weighted base member 34, preferably of substantially cylindrical shape with a central throughbore is attached to the underside of the upper surface 14 of the variable volume reservoir 12. Thus, as shown, liquid-tight attachment is effected between the film 14 and the surrounding circular face of the weight 34. Consequently, the mass of member 34 pulling downward (aft) on the surface 14, under force of gravity, will cause a depression in the surface 14 that funnels propellant on the upper surface into the depression. A hole in membrane 14 coincides with the throughbore of member 34. A flexible propellant drain line 38 extends into the throughbore of weighted member 34 to drain liquid propellant out of the depression, for charging to the rocket engine. As shown, the particular depression 16 is also equipped with a series of vertical baffles 15 that extend upward (forward) from an upper surface of the weighted member 34, around its throughbore, and into the depression in order to prevent swirling of liquid in the depression. Thus, propellant 24 converges into depression 16 and is carried from the base of this depression into flexible tube 38, engine charge conduit 40, and thence to the rocket engine 42.

Figure 1B:
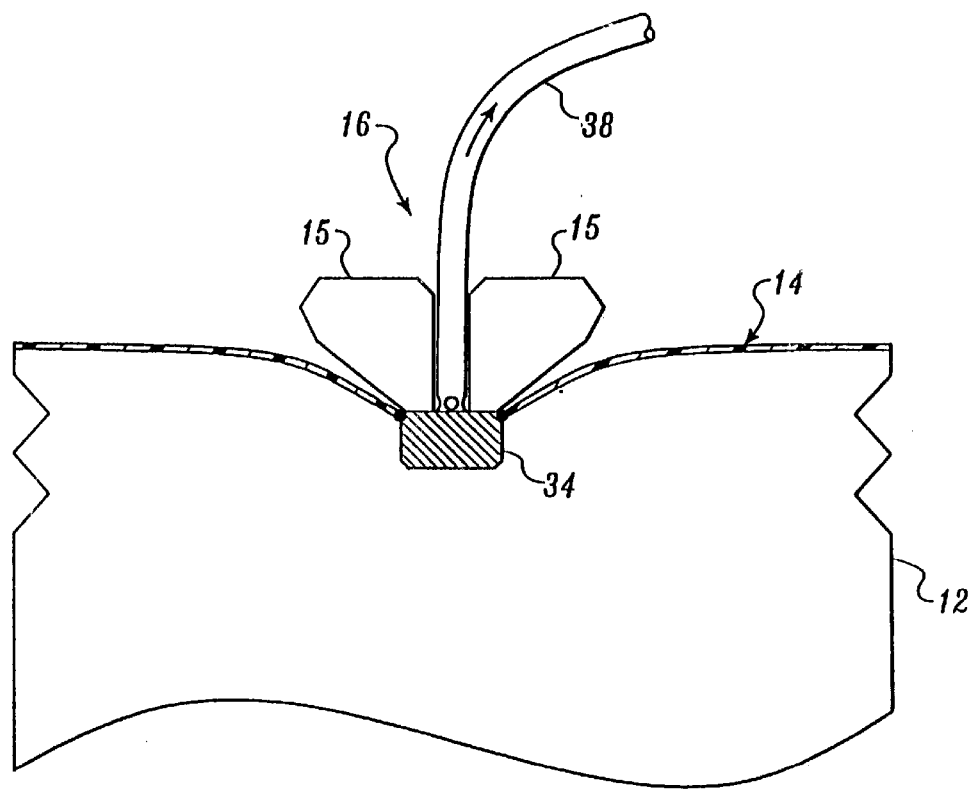
FIG. 1B is an alternative embodiment of the propellant drainage apparatus.

In an alternative embodiment, shown in FIG. 1B, the weighted member 34 has no throughbore and the flexible drain tube 38 extends forward from the depression, with its forward end firmly attached to the member 34. The tube 38 has a series of perforations near its forward end, in the depression 16, to allow fluid communication from the depression 16 into the tube 16. For a particular application, a selection can be made between the embodiments of FIGS. 1A and 1B to minimize the risk of tube 38 becoming kinked and twisted while in use, thereby restricting propellant flow.

In the embodiment shown in FIG. 1, flexible tube 38 extends upward (forward) from the base member 34 and snakes around and aft along the side of reservoir 12 to exit the housing 10 at the aft base of the housing for connection to conduit 40. It is important to select a pathway for tube 38 that avoids pinching or crimping of the tube that may affect propellant flow rate.

As to the pressurized propellant 44 contained within flexible reservoir 12, this propellant is gradually expelled from the reservoir as pressure is communicated to it from the vapor (of propellant 24) in ullage space 30. Thus, the upper surface 14 of the substantially cylindrical (when fully inflated) reservoir 12 is controlledly pushed downward (aft) toward the base of the reservoir 18, as the reservoir is being depleted of propellant. As shown, the reservoir 12 is preferably corrugated circumferentially 13, although other means may also be used to allow controlled collapse in a bellows-like fashion, as it is drained. The propellant 44 flows through a conduit 46 in the base of the reservoir 12 to the rocket engine 42. As propellant is charged to the engine 42, pressurizing propellant volume 20 decreases, pressurized propellant volume 22 decreases, and vapor-filled ullage space 30 increases.

As explained above, the system of the invention may also be used to provide high-pressure gas for other applications onboard the vehicle. In the embodiment of FIG. 1, vapor is withdrawn from ullage space 30 through a vapor/liquid separator 28, capable of blocking liquid flow but allowing vapor to flow, into a conduit 32 that extends through the housing 10. The vapor exiting through conduit 32 is controlled by a control valve 36 and is directed to onboard uses through conduit 37.

Figure 2:
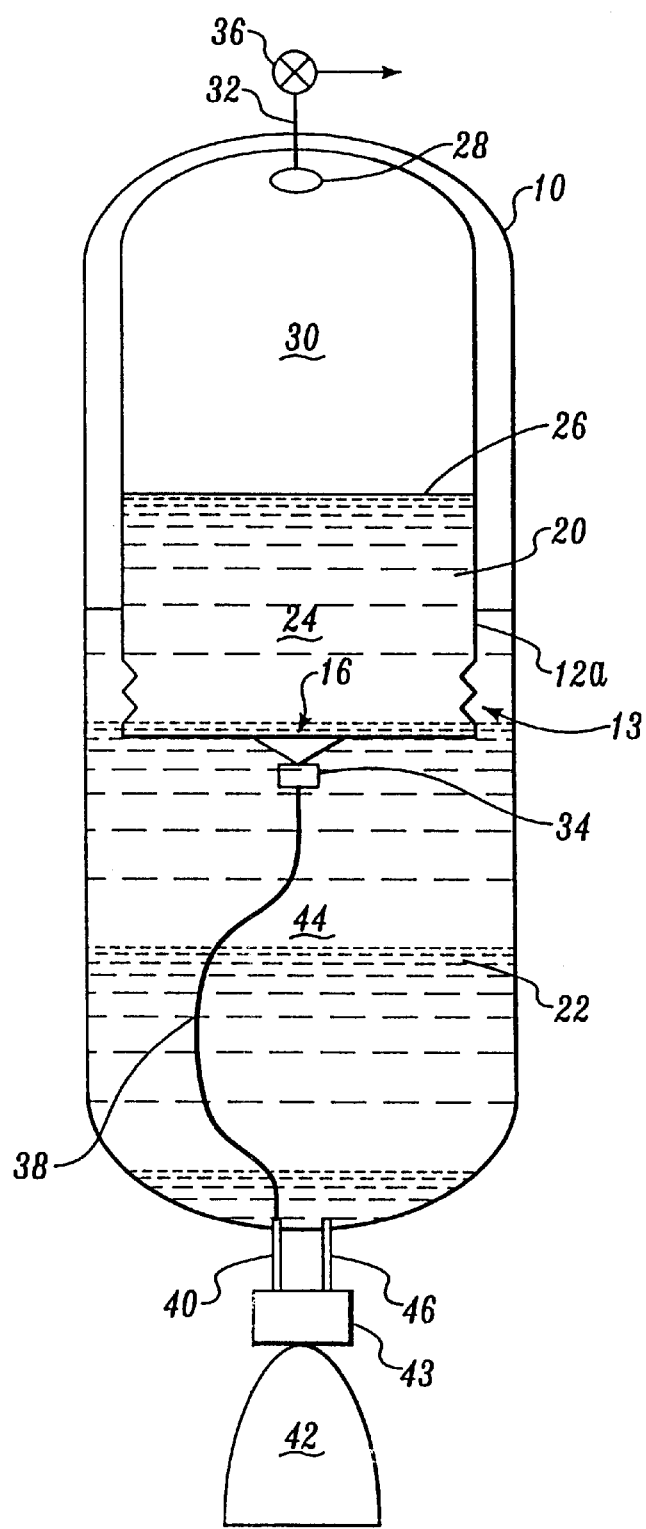
FIG. 2 is a schematic diagram of another embodiment of the invention wherein the propellants are contained in a single housing, with the pressurizing propellant and its vapor contained in a variable volume reservoir.

FIG. 2 illustrates an alternative embodiment of the invention, also utilizing a single substantially cylindrical housing 10 to contain both a pressurizing propellant 24 and a pressurized propellant 44. In this embodiment, the cylindrical housing 10 shown contains a substantially cylindrical reservoir 12a of variable volume that is suspended from the top end of the housing. The reservoir 12a extends into, and is at least partially surrounded by the pressurized propellant 44. As shown, reservoir 12a is half empty so that the ullage space 30 of the reservoir is filled with its vapor. The pressure of this vapor, and reduction in volume of propellant 44, causes expansion of reservoir 12a. The expansion in volume of reservoir 12a in turn pressurizes the propellant 44 and expels this propellant under pressure through conduit 46 to the rocket engine 42. Once again, it is preferred that the reservoir 12a be equipped with a funnel-shaped mouth 16 this time at the lower (aft) face of the reservoir and directed to receive propellant from inside the reservoir. Propellant flows from funnel 16 through a throughbore in weighted member 34 into flexible conduit 38 that extends substantially straight aft to connect to rocket charge conduit 40 that penetrates housing 10.

As in the embodiment of FIG. 1, this embodiment also allows the withdrawal of high-pressure vapor from ullage space 30 for other uses onboard the vehicle. However, in this case, the conduit 32 penetrates through the top of housing 10, and also the top of reservoir 12a to enter the ullage space 30 of reservoir 12a. As before, vapor is withdrawn through a vapor/liquid separator 28 into conduit 32, under control of valve 36, into conduit 37.

Figure 3:
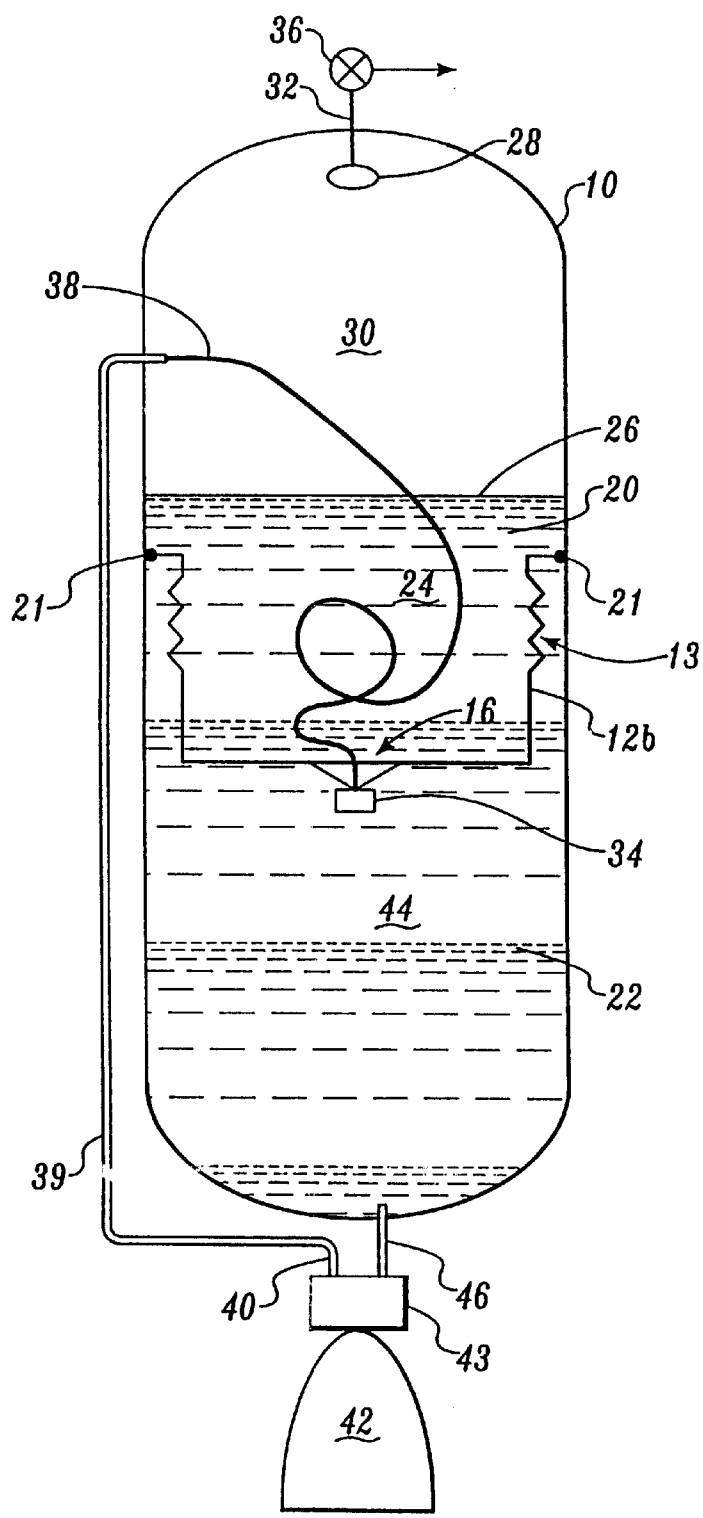
FIG. 3 is another embodiment of the single-housing embodiment of the invention, where the housing is subdivided into two compartments by a flexible, displaceable diaphragm, with the pressuring propellant and its vapor on one side of the diaphragm, and the other propellant on the other side of the diaphragm.

FIG. 3 illustrates a further alternative design of the single-housing embodiment of the invention. The embodiment of FIG. 3 utilizes a preferred bellows-like expandable/collapsible diaphragm 12b to divide the interior space of the housing 10 into two sections: an aft section with volume 22 containing the pressurized propellant 44; and a forward-section with volumes 20 and 30, where volume 20 contains pressurizing propellant 24 and volume 30 contains vapor. Thus, as propellant is drained from the substantially cylindrical housing 10, cylindrical diaphragm 12b expands downward (although the volume 20 of liquid propellant 24 also reduces, the amount of vapor in space 30 increases), increasing the ullage space 30 that contains vapor, and decreasing the pressurized propellant containment space 22. It is preferred that the diaphragm should not be placed under significant tension when it expands. Rather, the diaphragm should be designed to be expandable, like a bellows, to minimize risk of tearing and possible cross-contamination of propellants 24 and 44.

Unlike in FIG. 2, the propellant is drained from the depression 16 in diaphragm 12b through a flexible conduit 38 into the ullage space 30 containing the pressurizing vapor. The conduit then extends through the side wall of housing 10 and connects an inflexible conduit 39, to connect with the charge circuit 40 of the rocket engine 42. Thus, it is not essential that the propellant 24 have a drain line that extends directly downward (or aft) to the rocket engine 42. The drain line 38 may be oriented in any one of several different ways, but preferably in such a manner as to allow substantially complete drainage of propellant 24 from the reservoir 12b, without crimping or pinching.

Figure 4:
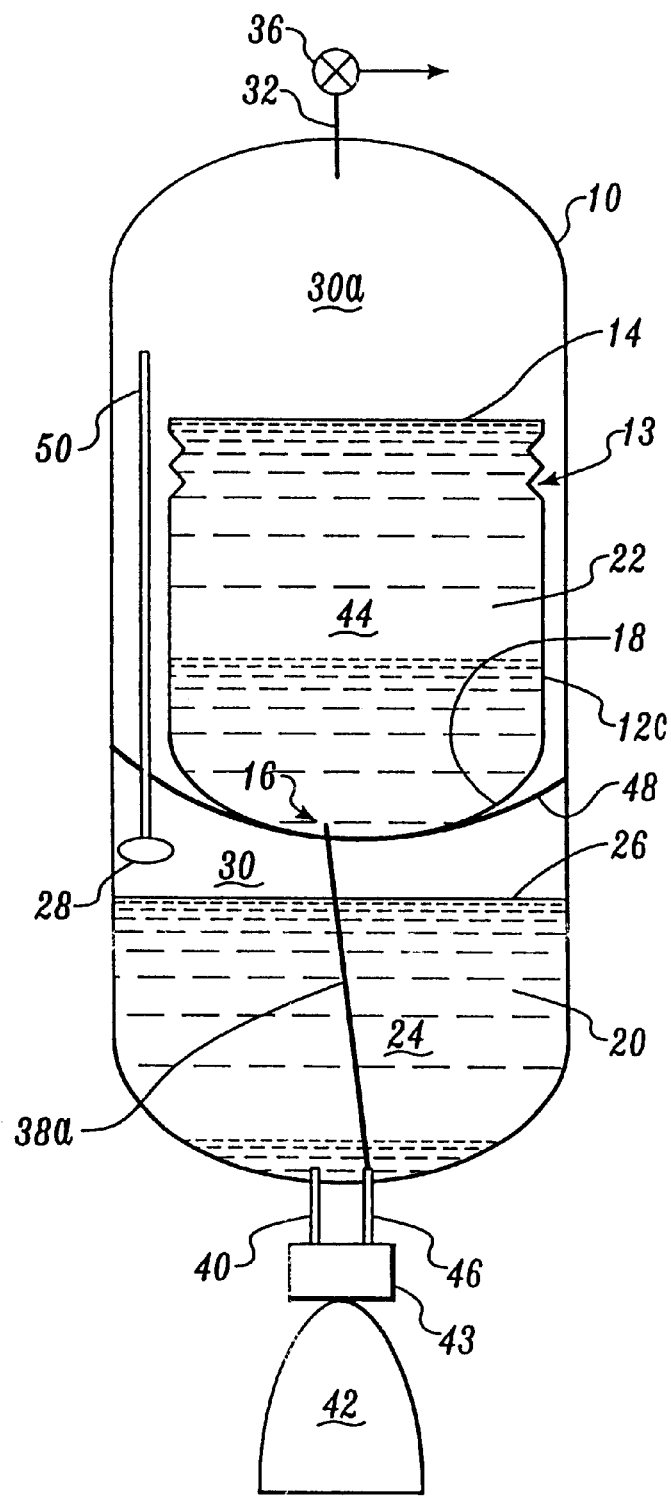
FIG. 4 is a further embodiment of the single-housing embodiment of the invention, with an internal rigid bulkhead dividing the housing into two compartments that are in pressure communicating relationship.

FIG. 4 schematically illustrates yet another embodiment of the invention using a single substantially cylindrical housing, in this instance, divided into two cylindrical sections by an internal dish-shaped bulkhead 48. In the embodiment shown, the lower (or aft) compartment includes an aft space 20 for containing the pressurizing propellant 24 and an ullage space 30, located between the liquid level 26 of the propellant 24 and the bulkhead 48. The ullage space 30 contains the vapor from the pressurizing propellant 24. On the other side (forward side) of the bulkhead 48, the housing 10 contains a flexible and collapsible reservoir 12c, substantially cylindrical in shape when full, that contains the pressurized propellant 44. Reservoir 12c rests on a convex surface of dish-shaped bulkhead 48. To ensure pressure communicating relationship between the two propellants, a pressure equalization conduit 50 (with liquid blocking device 28 at its aft end) penetrates bulkhead 48 and extends from one side of the bulkhead, the ullage space 30, into an ullage space 30a on the other side of the bulkhead that surrounds reservoir 12c.

As pressurizing propellant 24 is drained from reservoir space 20 into rocket engine feed conduit 40 that penetrates the aft base of housing 10, the vapor ullage space 30 increases. Vapor in this ullage space, in fluid communication with vapor in ullage space 30a via equalization line 50, exerts pressure on reservoir 12c causing the upper surface 14 of the reservoir to move downward (or aft) toward the base 18 of the reservoir. This forces propellant 44 from reservoir internal space 22 into propellant drain conduit 38a, that extends from the base 18 of reservoir 12c through bulkhead 48 to the base of the housing 10 for connection to engine feed conduit 46 that extends through the housing base. Drain conduit 38a is either a rigid or a flexible conduit. The bottom 18 of the flexible, variable volume reservoir 12c conforms to the forward convex surface of the disk-shaped bulkhead 48, forming a depression to ensure substantially complete drainage of the reservoir.

As before, this embodiment is also equipped with a system for removing high-pressure vapor from ullage space 30a for other uses onboard the vehicle.

Figure 5:
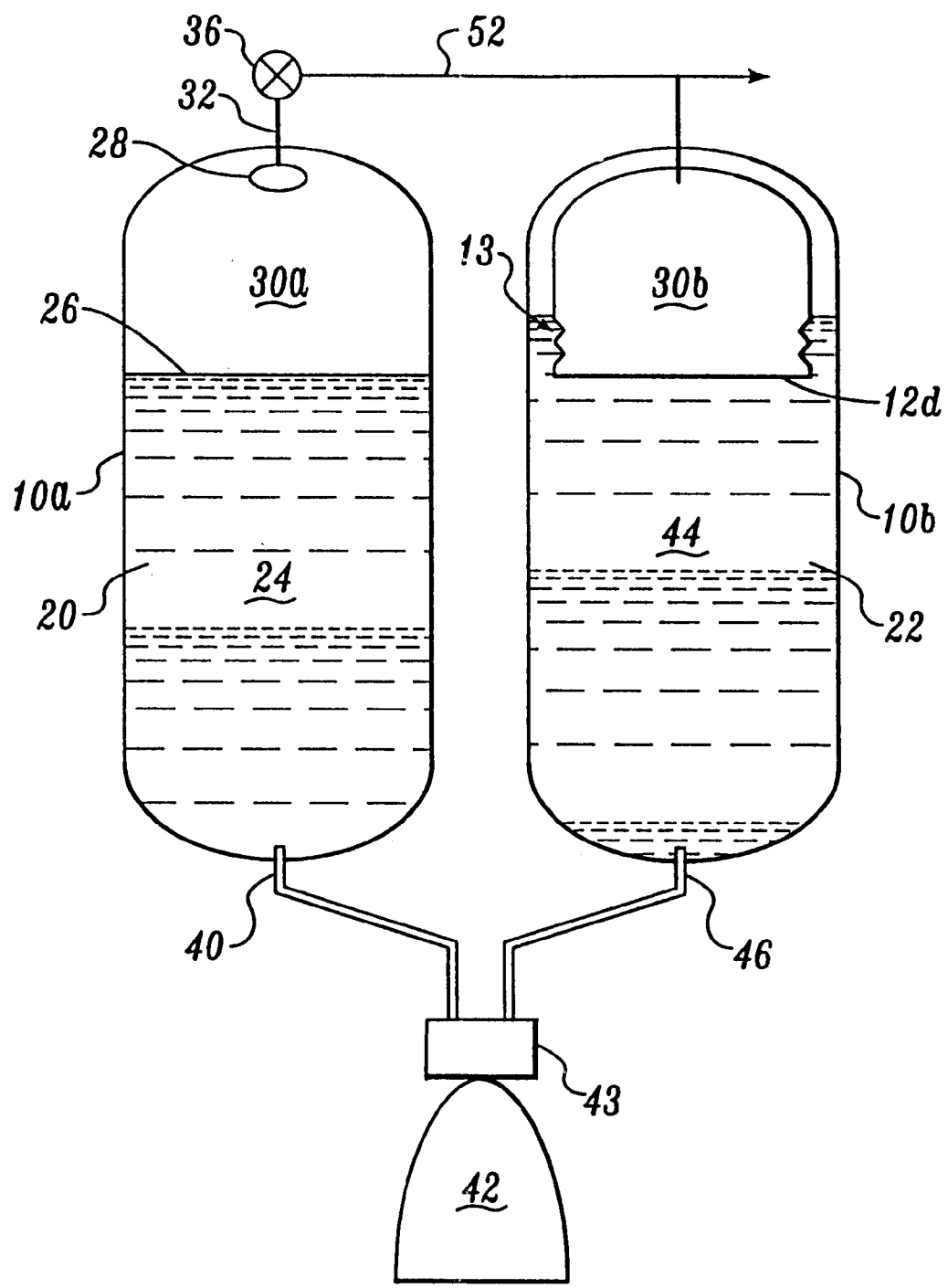
FIG. 5 is an embodiment of a multiple-housing embodiment of the invention, where the vapor of the pressurizing propellant in one housing is in pressure communicating relationship with a variable volume container in another housing containing the other propellant.

FIG. 5 illustrates a "two-tank" embodiment of the invention. As explained above, in certain circumstances it may be desirable to separate the pressurized propellant from the pressured propellant more completely. Under these circumstances, a design such as that shown in FIG. 5, or a variant thereof, may be used to good effect. As shown, the pressurizing propellant 24 is contained in space 20 of the substantially cylindrical tank 10a. The propellant 24 is in fluid communication with an ullage space 30a containing equilibrium vapor from the propellant, and a rocket engine feed conduit 40 that extends from the base aft end) of tank 10a for charging propellant to the rocket engine 42. Vapor from ullage space 30 enters a vapor/liquid separator and flows into a vapor conduit 32 that extends through the upper (forward) end of tank 10a. Vapor flow through conduit 32 is controlled by valve 36, and controlled vapor flow is directed through conduit 52 into a flexible, substantially cylindrical bellows-like, reservoir 12d, housed within a second tank 10b. As shown, the reservoir 12d is maintained in the upper end (forward end) of the tank 10b, that is otherwise filled with pressurized propellant 44. The pressurized propellant is in fluid communication with conduit 46 in the base of tank 10b that conveys the propellant to engine 42. Thus, as vapor enters the bellows-like expandable vapor reservoir 12d, the reservoir 12d expands forcing propellant 44 into conduit 46 and thence to the rocket engine.

Figure 6:
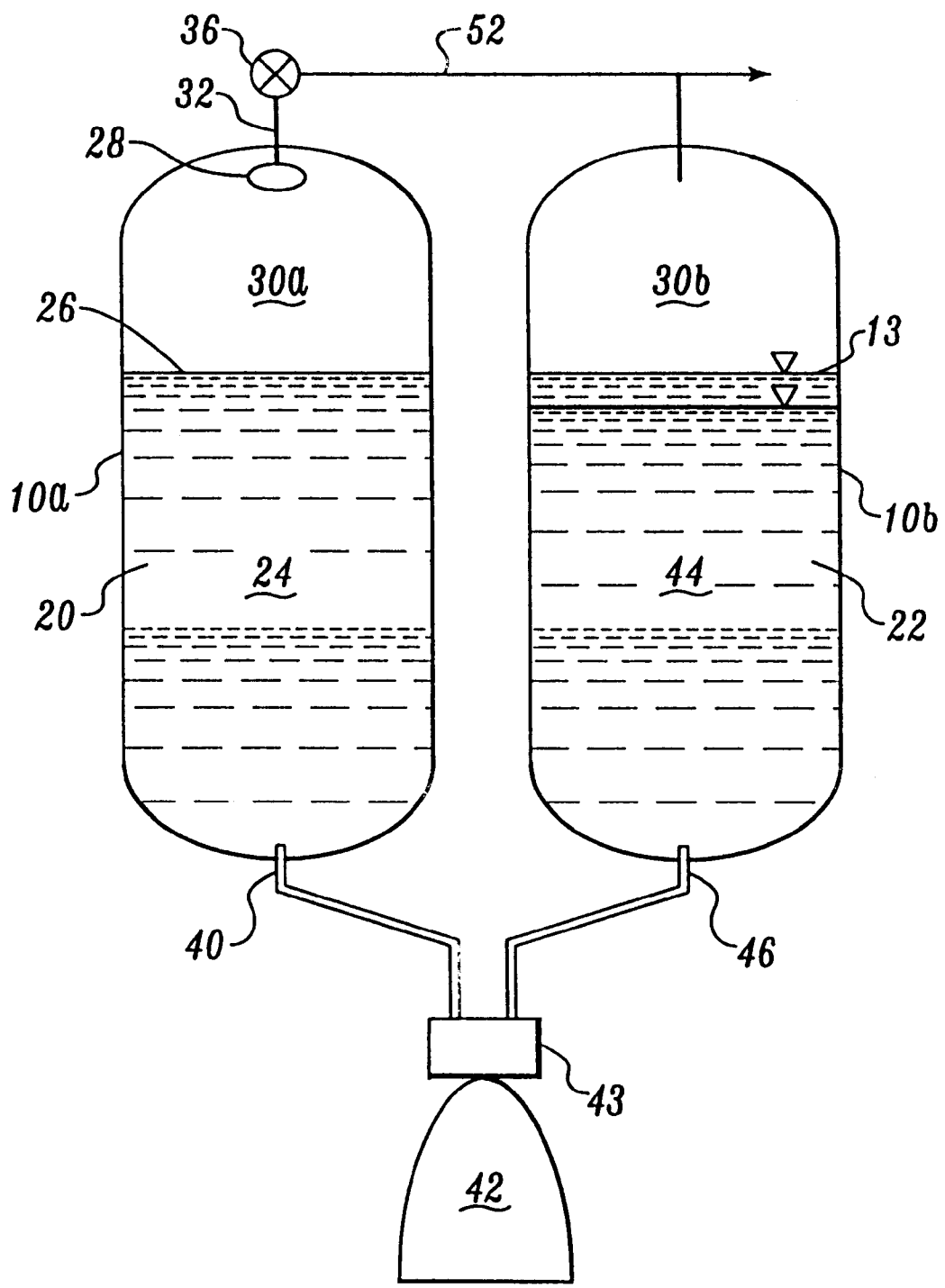
FIG. 6 is yet a further embodiment of the invention, schematically illustrating a multiple-housing embodiment of the invention, where the vapor of the pressurizing propellant in one housing is in pressure communicating relationship with a layer of inert fluid that covers the surface of the pressurized propellant in the other housing to prevent direct contact between vapor and pressurized propellant.

In a further alternative embodiment, the intermediate bladder or diaphragm may be replaced with an inert liquid or gas, such as silicone oil or terrafluoromethane, to cause physical separation between the pressurizing propellant and the pressurized propellants, without interfering with the pressure communicating relationship between the propellants. This embodiment is exemplified in FIG. 6, illustrating two side-by-side propellant housings 10a and 10b, each substantially cylindrical in shape, and in pressure communicating relationship with each other. As in FIG. 5, the pressurizing propellant 24 is contained in housing 10a, and its vapor 20 fills the ullage space 30a and communicates through conduit 52 with the ullage space 30b of container 10b, that contains the pressurized propellant 44.

However, to prevent direct contact between the vapor of propellant 24, and liquid propellant 44, a preferably inert fluid 13 is interposed on the surface of propellant 44. Preferably, this layer of fluid is sufficiently thick to prevent contact under operational conditions, while it is at the same time minimized to avoid carrying excess mass of this fluid, which is ordinarily not a propellant. If the fluid 13 is a liquid, it would have to be less dense than the pressurized propellant and nonmiscible with this propellant, so that it will float on the surface of propellant 44. If the fluid is a gas, it must have a density greater than that of the pressurizing vapor. In this embodiment, once the vehicle is in a zero gravity condition, mixing of all materials in tank 10b will take place, and the system would no longer be usable. Thus, the system is only suitable for use in the lower stages of a launch vehicle, for example.

The pressurizing propellant, or more volatile propellant, must desirably have the following characteristics: it must be a good fuel or oxidizer for a rocket engine; it must be compatible with materials suitable for system construction; it must have adequate vapor pressure, at the initial operating temperature of the rocket, to provide the necessary degree of pressurization for rocket engine ignition and operation; it must have physical properties such that sufficient volatile propellant can evaporate to complete the expulsion of both the pressurized propellant, and pressured propellants, from the propellant supply system of the rocket engine, while maintaining at least the minimum pressure necessary for rocket operation. Typical lower pressure limits for conventional pressure-fed bipropellant rocket engines are approximately 1 MPa tank pressure.

The preferred propellants are nitrous oxide; ammonia, ethane; propane; and higher hydrocarbons that contain dissolved methane, ethylene, or ethane to provide vapor pressure. Preferred oxidizers include hydrogen peroxide, perchioryl fluoride, nitrogen tetroxide, and various grades of nitric acid. The most preferred oxidizer is hydrogen peroxide, due to its good performance, low cost, high density, and lack of nitrogen tetroxide toxicity. Nitromethane, nitroethane, and nitropropane are believed to be suitable fuels for use with nitrous oxide because they have a lower oxidizer to fuel ratio (to minimize the volume occupied by the relatively low density nitrous oxide) and have a higher density than that of nitrous oxide (important for the embodiments illustrated in FIGS. 1,2, and 3).

As the propellants are withdrawn from the tank 10, the volatile propellant 24 evaporates to provide pressurizing gas. As evaporation takes place, the energy for evaporation is withdrawn primarily from the volatile propellant 24, which cools in spite of a certain amount of heat flow from the tank walls and the other propellant 44 in the tank. As the volatile propellant cools, its vapor pressure drops and the pressure throughout the propellant tank drops correspondingly.

Because only a fraction of the volatile propellant 24 evaporates, it will only cool modestly as the propellants are expelled from the tank. The remainder of the somewhat cooled volatile propellant is burned in the engine. In effect, the volatile propellant is acting as its own heat sink for provision of energy for liquid evaporation. This distinguishes this system from a conventional liquid evaporation propellant pressurization system, which relies on an external source of heat to provide the energy needed for evaporation.

If a volatile propellant of a mixed chemical composition is used, the propellant mix will be selectively depleted of its volatile component as it evaporates. This will act to lower the vapor pressure of the mix continuously as the propellants are withdrawn via a mechanism independent of the lowering of vapor pressure due to temperature drop.

The progressive pressure drop caused by propellant cooling and by depletion of volatile components acts to automatically reduce tank pressure and thus rocket thrust throughout a rocket burn. This gives a form of automatic throttling which usefully limits the final acceleration of the rocket.

The performance of the described system depends strongly on the final density of the pressurizing gas at the end of a rocket burn (the lower the better). This drives the system to use volatile propellants which generate a low molecular weight gas phase. For a given volatile propellant, the gas density depends on the final pressure and temperature of the gas. Rocket performance may thus be improved by arranging the propellant supply system to have a low tank pressure at the termination of the rocket burn (even if for performance reasons pressure was high at the beginning of the burn), and/or by heating the pressurizing gas. These refinements are not absolutely required for the implementation of the system, as volatile propellants such as ethane or ethane mixed with higher hydrocarbons give good performance even in a simple passive sealed system following its natural pressure and temperature history.

As explained above, to reduce the pressure (and thus, the gas density and mass at the end of a rocket burn), pressurizing gas may be bled from the top of the tank during liquid propellant withdrawal, and used for a variety of purposes. The bleeding of gas causes a pressure drop which increases evaporation of the liquid phase of the volatile propellant. This in turn cools the liquid, which lowers its vapor pressure, driving down the tank pressure more rapidly than would happen otherwise.

To increase the temperature of the pressurizing gas (and thus, reduce its density), hot gas from a solid or liquid gas generator may be injected into the ullage space of the tank. Alternatively, decomposed hydrogen peroxide (which produces a jet of hot steam and oxygen which spontaneously reacts with fuel vapors) may be used.

When all but residual liquid propellant has been expelled from the tank, the tank will still contain a substantial mass of high pressure gas. After the main engine has shut down, this gas may be exhausted through the engine, recapturing heat from the still-hot engine and giving a small additional amount of thrust to improve the rocket performance.

The operation of the pressurization system naturally generates a large mass of high pressure gas in the ullage space of the tank. This may be tapped for other uses by a fitting at the top of the compartment containing the volatile propellant. For zero gravity operations, a liquid blocking device may be used to ensure that only gas is removed from the tank. Gas withdrawn in this way may be used in a gas injection thrust vector control system for the main engine. The same gas can be used in cold gas thrusters for roll control and for stage separation maneuvers (replacing the solid rockets normally used for the latter). In upper stages gas may be used in cold gas thrusters for attitude control, propellant settling, minor course corrections, and rendezvous maneuvers.

Volatile propellants used for tank pressurization are always just at their boiling temperature in tanks. A small pressure drop will thus cause vapor formation. At the engine of an accelerating vehicle, the volatile propellant is under a modest hydraulic head, but it is likely that any attempt to throttle its flow will result in cavitation and two phase flow downstream of the valve, which may be undesirable in the engine injector. Propellant feed systems for the volatile propellant are likely therefore to be designed to minimize pressure drops, and use an engine shutoff valve which provides an unrestricted flow path when open. With "wide-open" volatile propellant flow to the engine, any adjustment to mixture ratio must then be done by throttling the other propellant. An alternative solution to the problem of potential two phase flow in injectors is to vaporize all of the volatile propellant before leading it to the injector, using a regenerative cooled thrust chamber or other suitable method of heating.

In most practical implementations of the invention, the propellant with the lower vapor pressure is positively expelled by a bladder or diaphragm system, and thus, is available under zero gravity conditions without a propellant settling maneuver.

In zero gravity conditions, a propellant settling maneuver is required before main engine ignition to ensure pickup of the volatile propellant. This can be done by the vehicle attitude control system. Alternatively, if the lower vapor pressure propellant is a monopropellant (e.g. hydrogen peroxide), the rocket engine may be operated in monopropellant mode first to settle the volatile propellant prior to bipropellant operation.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, any means-plus-function clauses are intended to cover the structures described herein as performing the recited function, and not only structural equivalents, but also equivalent structures. Thus, although a nail and a screw may not be structural equivalents in that a nail employs a cylindrical surface to secure wooden workpieces together, whereas a screw employs a helical surface, in the environment of fastening wooden workpieces, a nail and a screw may nevertheless be equivalent structures.

I claim:

1. A system for pressurized feeding of liquid rocket propellants to a rocket engine of a rocket-propelled vehicle, the system comprising:

(a) a first reservoir mounted on board the rocket-propelled vehicle, the first reservoir containing a first volatile liquid rocket propellant; and (b) a second reservoir, in pressure communicating relationship with the first reservoir, the second reservoir containing a second less volatile liquid rocket propellant;

wherein the volatility of the first volatile liquid propellant is sufficient under operating conditions to pressure feed both the first propellant and the second propellant into a rocket engine without the need for a separate feed mechanism.

2. The system of claim 1, further comprising a first conduit for coupling the first reservoir to the engine, and a second conduit for coupling the second reservoir to the engine.

3. The system of claim 1, wherein the first and second reservoirs are housed in a common container.

4. The system of claim 3, wherein the second reservoir is a container able to vary an internal volume thereof.

5. The system of claim 4, wherein the second reservoir is substantially cylindrical with circumferential crimping to allow controlled internal volume expansion and contraction thereof.

6. The system of claim 5, wherein a vapor space is formed above a liquid level of the first propellant in the common container, the vapor space in pressure communicating relationship with the second reservoir.

7. The system of claim 6, further comprising a conduit in fluid communication with the vapor space to remove vapor under pressure from the space.

8. The system of claim 3, wherein the common container includes a diaphragm, the diaphragm dividing the container into a reservoir containing the second propellant and a reservoir comprising a portion containing the first propellant and a portion containing vapor.

9. The system of claim 8, wherein the volume of the portion filled with vapor increases, and both the size of the portion containing the first propellant and the size of the reservoir containing the second propellant decrease, as the first and second propellants are fed from the reservoirs to the rocket engine.

10. The system of claim 8, wherein the diaphragm comprises a reservoir of variable volume, containing the first propellant.

11. The system of claim 3, further comprising a bulkhead dividing the common container and interposed between the first and second reservoirs.

12. The system of claim 11, wherein the second reservoir comprises a variable volume reservoir, the second reservoir located to seat upon the bulkhead.

13. The system of claim 12, wherein a balance line penetrates the bulkhead to enable pressure communication between opposite sides of the bulkhead.

14. The system of claim 1, wherein the first and second reservoirs are housed in a first container and a second container, respectively.

15. The system of claim 14, wherein a vapor space of the first reservoir in the first container is in pressure communicating relationship with an expandable container in the second container, the expandable container in pressure communicating relationship with the second reservoir in the second container.

16. The system of claim 1, further comprising a third reservoir containing a third liquid rocket propellant, the third liquid rocket propellant having a different volatility than the first and second liquid propellants.

17. A method of providing liquid propellants to a rocket engine, the method comprising:

(a) applying pressure from a first liquid propellant, having a first volatility, to a second liquid propellant, having a second volatility, the second volatility being less than the first volatility and the first volatility being sufficient under operating conditions to pressure feed both the first and second propellants into the rocket engine without the need for a separate feed mechanism;

(b) feeding both the first and second propellants under motive force of the applied pressure of the first propellant to a rocket engine; and (c) utilizing the first and second propellants in the rocket engine to provide propulsion.

18. The method of claim 17, further comprising removing an ullage gas comprised of vapor from the first propellant and using the removed gas in cold gas thrusters.

19. The method of claim 17, wherein the step of applying pressure includes applying pressure to an inert fluid, the fluid interposed between vapor of the first propellant and tile second propellant.

20. The method of claim 17, wherein the first propellant is selected from the group consisting of ethane, ammonia, nitrous oxide, propane, and light hydrocarbons containing dissolved ethane, ethylene or methane.

21. The method of claim 17, wherein the second propellant is selected from the group consisting of hydrogen peroxide, nitric acid, nitrogen tetroxide, perchloryl fluoride.

22. The method of claim 17, wherein the feeding under motive force of step (b) includes pumping either or both of the first propellant and the second propellant to assist the feeding of either or both of the first propellant and the second propellant to the rocket engine.

23. A method of transferring liquid propellant from a donor tank to a receiving tank, the method comprising:

(a) establishing fluid communication between the donor tank and the receiving tank;

(b) applying pressure produced by a first liquid propellant having a first volatility to a second liquid propellant having a second volatility that is lower than the first volatility in the donor tank, the first volatility being sufficient under operating conditions to pressurize both the first propellant and the second propellant to a pressure higher than the pressure of the receiving tank; and (c) flowing the second liquid propellant from the donor tank to the receiving tank using only the pressure produced by the first liquid propellant.

24. The method of claim 23, wherein the pressurizing of the propellants of step (b) includes heating of the first liquid propellant to cause vaporization of a portion of the first propellant, the vapor of the heated propellant in pressure communicating relationship with the second pressurized liquid propellant.

25. The method of claim 23, wherein the steps (a), (b) and (c) are carried out under conditions of substantially zero gravity.

26. The method of claim 24, wherein the heating is by electrical means.

27. The method of claim 23, further comprising transferring the first pressurizing propellant of step (b) to a receiving reservoir of the receiving tank.

* * * * *

UNITED STATES PATENT AND TRADEMARK OFFICE
CERTIFICATE OF CORRECTION

PATENT NO. : 5,961,074
DATED : October 5, 1999
INVENTOR(S) : B.P. Dunn

It is certified that error appears in the above-identified patent and that said Letters Patent is hereby corrected as shown below:

COLUMN    LINE

14            45          "tile" should read --the--
(Claim 19, line 3)

Signed and Sealed this

Twentieth Day of June, 2000

Attest:

Q. TODD DICKINSON

*Attesting Officer*              *Director of Patents and Trademarks*